United States Patent
Zhang et al.

(10) Patent No.: US 9,325,744 B2
(45) Date of Patent: Apr. 26, 2016

(54) METHOD, DEVICE, AND SYSTEM FOR CONTROLLING IPTV (INTERNET PROTOCOL TELEVISION) CONTENT REPORTING CONFIGURING UPDATES

(71) Applicant: Huawei Technologies Co., Ltd., Shenzhen (CN)

(72) Inventors: Yuanyuan Zhang, Nanjing (CN); Peiyu Yue, Nanjing (CN); Teng Shi, Nanjing (CN); Linyi Tian, Shenzhen (CN); Yonghui Tian, Nanjing (CN); Chuxiong Zhang, Nanjing (CN); Guangyuan Liu, Shenzhen (CN); Weizhong Yuan, Shenzhen (CN); Renzhou Zhang, Nanjing (CN); Lingyan Wu, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 693 days.

(21) Appl. No.: 13/670,229

(22) Filed: Nov. 6, 2012

(65) Prior Publication Data

US 2013/0067104 A1    Mar. 14, 2013

Related U.S. Application Data

(63) Continuation of application No. PCT/CN2011/073171, filed on May 6, 2011.

(30) Foreign Application Priority Data

May 6, 2010 (CN) .......................... 2010 1 0168686

(51) Int. Cl.
*G06F 15/16* (2006.01)
*H04L 29/06* (2006.01)
(Continued)

(52) U.S. Cl.
CPC ........ *H04L 65/1016* (2013.01); *H04L 65/1006* (2013.01); *H04L 65/1059* (2013.01);
(Continued)

(58) Field of Classification Search
CPC ............ H04L 65/1066; H04L 65/1083; H04L 65/403
USPC .......................... 709/202–203, 227–228, 230
See application file for complete search history.

(56) References Cited

U.S. PATENT DOCUMENTS 8,429,287 B2 * 4/2013 Sullivan ................... H04N 7/24
709/203
8,863,229 B2 * 10/2014 You .............................. 709/223
(Continued)

FOREIGN PATENT DOCUMENTS

CN          1976348 A       6/2007
CN        101415250 A       4/2009
WO    WO 2005/109821 A1   11/2005

OTHER PUBLICATIONS

International Search Report issued in corresponding PCT Patent Application No. PCT/CN2011/073171, mailed Aug. 11, 2011.
(Continued)

*Primary Examiner* — Bharat N Barot
(74) *Attorney, Agent, or Firm* — Brinks Gilson & Lione

(57) ABSTRACT

The present invention relates to the multimedia field, and discloses a method, a device, and a system for controlling content report behavior. The method includes: receiving a request for subscribing to a configuration update notification, in which the request is sent by the terminal or the media control function, and a configuration update request that is sent by an SCF and carries the new content report configuration information, and sending a configuration update notification message to the terminal or the media control function, where the configuration update notification message carries the new content report configuration information or acquiring information thereof. The method of the present invention avoids using the message body of the SIP message to transmit the content report configuration information, is compliant and compatible with logic for processing a SIP INFO message specified in the RFC 2976.

23 Claims, 5 Drawing Sheets

(51) Int. Cl.
*H04N 21/2543* (2011.01)
*H04N 21/442* (2011.01)
*H04N 21/643* (2011.01)
*H04N 21/658* (2011.01)
*H04L 29/08* (2006.01)
*H04N 21/24* (2011.01)
*H04N 21/6547* (2011.01)

(52) U.S. Cl.
CPC ........ *H04L65/1066* (2013.01); *H04L 65/1083* (2013.01); *H04L 65/403* (2013.01); *H04L 67/22* (2013.01); *H04N 21/2405* (2013.01); *H04N 21/2543* (2013.01); *H04N 21/44222* (2013.01); *H04N 21/64322* (2013.01); *H04N 21/6547* (2013.01); *H04N 21/6582* (2013.01)

(56) References Cited

U.S. PATENT DOCUMENTS

| | | | | |
|---|---|---|---|---|
| 9,037,734 | B2* | 5/2015 | Kim et al. | 709/228 |
| 2002/0083179 | A1* | 6/2002 | Shaw | G06F 17/30902 709/227 |
| 2007/0005791 | A1* | 1/2007 | Goulden | G06Q 30/02 709/231 |
| 2007/0088838 | A1* | 4/2007 | Levkovitz | G06Q 30/02 709/228 |
| 2007/0248106 | A1* | 10/2007 | Liu | H04L 12/5695 370/401 |
| 2008/0310446 | A1 | 12/2008 | Bellwood et al. | |
| 2009/0037425 | A1* | 2/2009 | Erickson | G06F 9/44505 709/203 |
| 2009/0319666 | A1 | 12/2009 | Liang et al. | |
| 2010/0312897 | A1* | 12/2010 | Allen et al. | 709/227 |
| 2011/0231553 | A1* | 9/2011 | Patel et al. | 709/227 |

OTHER PUBLICATIONS

Written Opinion of the International Searching Authority issued in corresponding PCT Patent Application No. PCT/CN2011/073171, mailed Aug. 11, 2011.
Campbell et al., "Session Initiation Protocol (SIP) Extension for Instant Messaging" Network Working Group, Dec. 2002.
Donovan et al., "Session Timers in the Session Initiation Protocol (SIP)" Network Working Group, Apr. 2005.
Orange SA, "Timer Indication for PSS Content Switching Information in SIP 200 OK Response to the SIP Info Message" 3GPP TSG-SA4#51 Meeting. Shenzhen, China, Nov. 3-8, 2008. Tdoc S4-080620.
LTE, ,3$^{rd}$ Generation Partnership Project; Technical Specification Group Services and System Aspects; IP Multimedia Subsystem (IMS) based Packet Switch Streaming (PSS) and Multimedia Broadcast/Multicast Service (MBMS) User Service; Protocols (Release 9) 3GPP TS 26.237, V9.2.0, Mar. 2010.
Extended European Search Report issued in corresponding European Patent Application No. 11777139.4, mailed Mar. 5, 2013.
US 9,195,461, 11/2015, Farrell (withdrawn)*

* cited by examiner

METHOD, DEVICE, AND SYSTEM FOR CONTROLLING IPTV (INTERNET PROTOCOL TELEVISION) CONTENT REPORTING CONFIGURING UPDATES

CROSS-REFERENCE TO RELATED APPLICATIONS

This application is a continuation of International Application No. PCT/CN2011/073171, filed on May 6, 2011, which claims priority to Chinese Patent Application No. 201010168686.7, filed on May 6, 2010, both of which are hereby incorporated by reference in their entireties.

FIELD OF THE INVENTION

The present invention relates to the multimedia field, and in particular, to a method, a device, and a system for controlling content report behavior.

BACKGROUND OF THE INVENTION

In an IPTV (Internet Protocol Television, Internet protocol television) system, in order to perform service operations such as collecting statistics and accounting, an SCF (Service Control Function, service control function) needs to know a watching record of a user. However, when content such as a channel or a requested program is switched, a signaling path may not include the SCF. Therefore, after the content is switched, another function, for example, a UE (User Equipment, user equipment) or an MCF (Media Control Function, media control function) in the content switching signaling path is required to send a content report to the SCF to notify the SCF of the content being currently watched by the user.

In a current content report flow, a client-server mode is adopted, and a load bottleneck unavoidably exists in the SCF. Therefore, the SCF needs to control content report behavior according to a load condition. For example, the SCF may control a content report timer, and the specific implementation is as follows: the SCF receives a SIP (Session Initiation Protocol, session initiation protocol) INFO request message which is sent by the UE or the MCF and carries content report information; generates an XML configuration file which includes new timer configuration information; and then generates a 200 OK response by using the XML configuration file as a message body so that the UE or the MCF modifies the content report timer according to the XML configuration file in the message body, and implements content report.

During implementation of the present invention, the inventors find that the prior art at least has the following problem: Some current specifications, for example, RFC 2976 SIP INFO Method, specify that the 200 OK response to the SIP INFO request cannot carry a message body, so the use of the method of the prior art may affect the compliance with logic for processing the SIP INFO message in the RFC 2976.

SUMMARY OF THE INVENTION

In order to be compatible with logic for processing a SIP INFO message specified in the RFC 2976, embodiments of the present invention provide a method, a device, and a system for controlling content report behavior. Technical solutions are given as follows:

A method for controlling content report behavior is provided, where the method includes:

generating a session initiation protocol SIP message, where a preset parameter in a header field of the SIP message carries new content report configuration information; and sending the SIP message to a terminal or a media control function MCF so that the terminal or the MCF implements content report according to the new content report configuration information.

A method for controlling content report behavior is provided, where the method includes:

receiving a request for subscribing to a configuration update notification and sent by a terminal or a media control function MCF;

receiving a configuration update request sent by a service control function SCF, where the configuration update request carries new content report configuration information; and sending a configuration update notification message to the terminal or the MCF, where the configuration update notification message carries the new content report configuration information or acquiring information of the new content report configuration information, so that the terminal or the MCF implements content report according to the new content report configuration information or the new content report configuration information obtained according to the acquiring information.

A device for controlling content report behavior is provided, where the device includes:

a generation module, configured to generate a session initiation protocol SIP message, where a preset parameter in a header field of the SIP message carries new content report configuration information; and a sending module, configured to send the SIP message generated by the generation module to a terminal or a media control function MCF, so that the terminal or the MCF implements content report according to the new content report configuration information.

A device for controlling content report behavior is provided, where the device includes:

a first receiving module, configured to receive a request for subscribing to a configuration update notification, in which the request is sent by a terminal or a media control function MCF;

a second receiving module, configured to receive a configuration update request sent by a service control function SCF, where the configuration update request carries new content report configuration information; and a sending module, configured to send a configuration update notification message to the terminal or the MCF subscribing to the configuration update notification in the first receiving module, where the configuration update notification message carries the new content report configuration information received by the second receiving module or acquiring information of the new content report configuration information, so that the terminal or the MCF implements content report according to the new content report configuration information or the new content report configuration information obtained according to the acquiring information.

A system for controlling content report behavior is provided, where the system at least includes a service control function SCF, and further includes a terminal or a media control function MCF, where:

the SCF is configured to: generate a session initiation protocol SIP message, where a preset parameter in a header field of the SIP message carries new content report configuration information; and send the SIP message to the terminal or the MCF; and the terminal or the MCF is configured to implement content report according to the new content report configuration information.

A system for controlling content report behavior is provided, where the system at least includes a profile server and a service control function SCF, and further includes a terminal or a media control function MCF, where:

the profile server is configured to: receive a request for subscribing to a configuration update notification, in which the request is sent by the terminal or the MCF; receive a configuration update request sent by the SCF, where the configuration update request carries new content report configuration information; and send a configuration update notification message to the terminal or the MCF, where the configuration update notification message carries the new content report configuration information or acquiring information of the new content report configuration information; and the terminal or the MCF is configured to implement content report according to the new content report configuration information or the new content report configuration information obtained according to the acquiring information.

The technical solutions provided in the embodiments of the present invention have the following beneficial effects.

The SIP header field parameter is extended to carry the new content report configuration information, or the request for subscribing to the configuration update notification, in which the request is sent by the terminal or the media control function and the configuration update request which carries the new content report configuration information and sent by the SCF are received, and the configuration update notification message carrying the new content report configuration information or the acquiring information of the new content report configuration information is sent to the terminal or the media control function, which avoids that the message body of a message in a SIP session is used to transmit the content report configuration information, so that the method is compliant and compatible with logic for processing a SIP INFO message specified in the RFC 2976.

DETAILED DESCRIPTION OF THE EMBODIMENTS

In order to make the objectives, technical solutions, and advantages of the present invention more comprehensible, embodiments of the present invention are further described in detail in the following with reference to the accompanying drawings.

Embodiment 1

Figure 1:
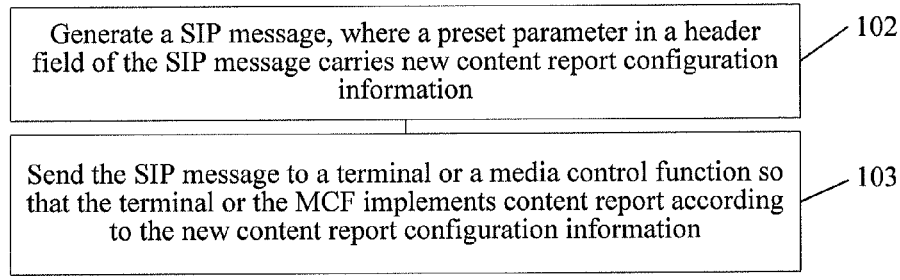
FIG. 1 is a flowchart of a method for controlling content report behavior according to Embodiment 1 of the present invention.

Referring to FIG. 1, this embodiment provides a method for controlling content report behavior. The method includes the following steps.

101: Generate a session initiation protocol SIP message, where a preset parameter in a header field of the SIP message carries new content report configuration information.

The SIP message may be a SIP 200 OK response message (session initiation protocol 200 success response message), a SIP UPDATE request message (session initiation protocol update request message), or a SIP re-INVITE request message (session initiation protocol re-invite request message); accordingly, the header field may be a recv-info (receiving information) header field. The SIP message may also be a SIP INFO request message (session initiation protocol information request message); accordingly, the header field may be an info-package (information package) header field.

The new content report configuration information includes at least one of configuration information of a content report timer, configuration information of a content report sending time interval, and configuration information of the number of content reports packaged together to be sent.

102: Send the SIP message to a terminal or a media control function so that the terminal or the MCF implements content report according to the new content report configuration information.

In the method provided in this embodiment, the SIP header field parameter is extended to carry the new content report configuration information, which avoids that the message body of a message in a SIP session is used to transmit the content report configuration information, so that the method is compliant and compatible with logic for processing a SIP INFO message specified in the RFC 2976.

The SIP message is the message in the session, so the new content report configuration information is only applicable to the session. Implementation of controlling the content report behavior is described for different SIP messages in the following.

Embodiment 2

Figure 2:
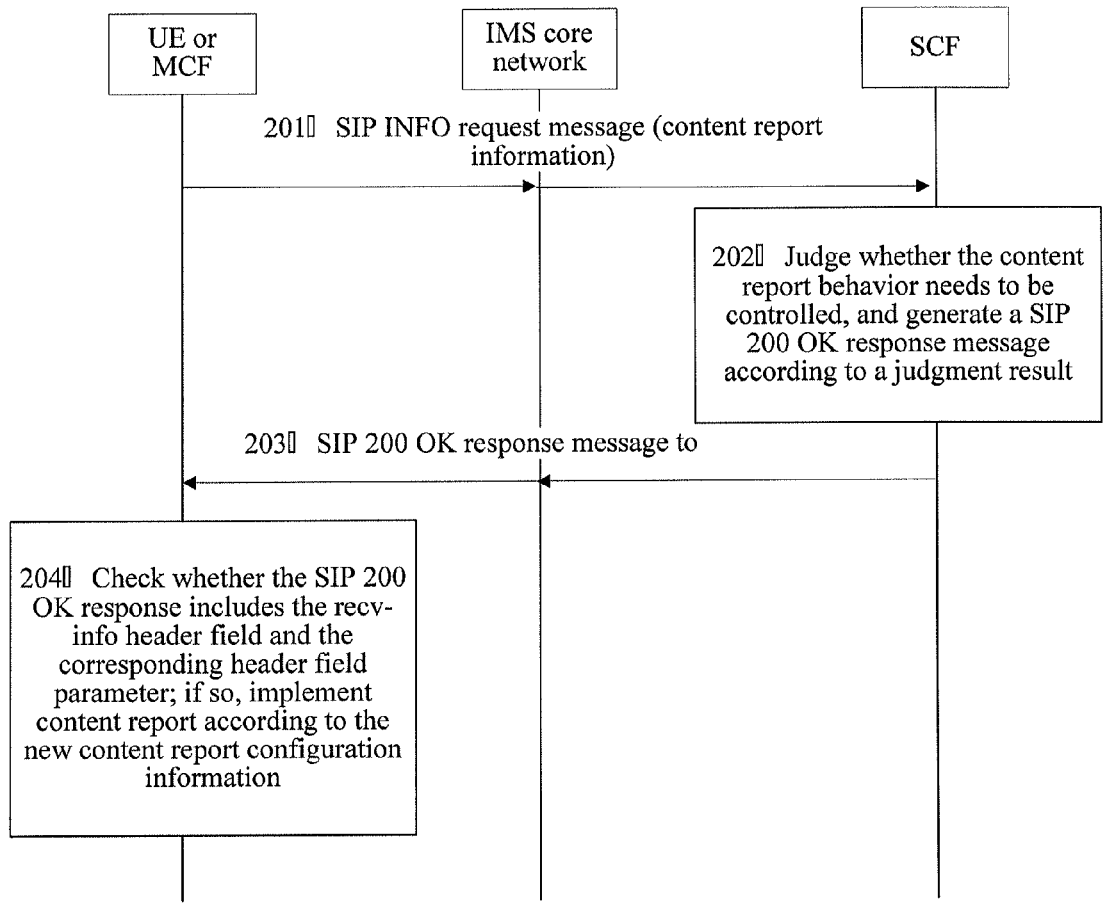
FIG. 2 is a diagram of information interaction for controlling content report behavior according to Embodiment 2 of the present invention.

Referring to FIG. 2, this embodiment provides a method for controlling content report behavior. The method includes the following steps.

201: An SCF receives a SIP INFO request message which carries content report information and is sent by a UE or an MCF.

The content report information may be information such as content currently watched by a user, and the content specifically refers to a channel or a requested program.

202: The SCF judges whether the content report behavior needs to be controlled, and generates a SIP 200 OK response message according to a judgment result.

The judgment basis of the SCF may be a current load condition of the SCF, which is not limited in this embodiment. If a current load of the SCF is too heavy, the content report behavior needs to be controlled.

The generating, by the SCF, a SIP 200 OK response message according to the judgment result specifically includes: judging, by the SCF, whether the content report behavior of the UE or the MCF needs to be controlled; and if the content report behavior of the UE or the MCF needs to be controlled, determining new content report configuration information, adding a recv-info header field in the SIP 200 OK response message, and carrying the determined new content report configuration information in a preset parameter of the recv-info header field. The content report configuration information includes at least one of configuration information of a content report timer, configuration information of a content report sending time interval, and configuration information of the number of content reports packaged together to be sent. Details are as follows:

If the SCF controls the content report timer on the UE or the MCF, the SCF sets a parameter timer in the recv-info header field of the SIP 200 OK response message, where the parameter timer is used to carry new configuration information of the content report timer.

If the SCF controls a content report sending frequency of the UE or the MCF, the SCF may configure the content report sending time interval of the UE or the MCF. At this time, the SCF carries a parameter interval in the recv-info header field of the SIP 200 OK response message, where the parameter interval is used to carry the configuration information of the content report sending time interval. Alternatively, the SCF may configure the number of content reports that may be packaged together and sent by the UE or the MCF. At this time, the SCF carries a parameter number in the recv-info header field of the SIP 200 OK response message, where the parameter number is used to carry the configuration information of the number of content reports that may be packaged together.

In comparison with the prior art, the range of controlling the content report behavior is wider in this embodiment. Not only can the content report timer be modified, but also the content report sending frequency can be controlled.

An example of the SIP 200 OK response message is shown in the following. In this example, SCF1 modifies a content report timer on MCF1 to 10 s, modifies a content report sending time interval to 600 s, and modifies the number of content reports packaged together to be sent to 50.

SIP/2.0 200 OK
Via: SIP/2.0/UDP pc33.example.com; branch=z9hG4bK776; received=192.0.2.1
To: MCF1 <sip:mcf1@example.com>; tag=a6c85cf
From: SCF1 <sip:scf1@example.com>; tag=1928301774
Call-ID: a84b4c76e66710@pc33.example.com
CSeq: 314159 INFO
Contact: <sip:scf1@pc33.example.com>
Recv-Info: ContentReporting; timer=10; interval=600; number=50

In order to avoid a logic conflict problem possibly caused by multiple parameters (for example, in the foregoing example, when a time interval between the time of sending the content report last time and the current time is 600 seconds, but the currently accumulated number of content reports to be sent is only 10, a problem is determined such as whether the content report needs to be sent), furthermore, this embodiment sets priority information of the content report configuration information in the recv-info header field. There are two manners of setting the priority information.

In the first manner, a header field parameter priority is added following the header field parameters timer, interval, and number to represent a priority of a corresponding header field parameter.

For example, referring to an example of Recv-Info1, a priority of interval is set to high, and a priority of number is set to low. In this way, when a time interval between the time of sending the content report last time and the current time is 600 seconds, but the currently accumulated number of content reports to be sent is only 10, according to the priority, the content report still needs to be sent. When a time interval between the time of sending the content report last time and the current time is 200 seconds, but the currently accumulated number of content reports to be sent is only 50, the content report does not need to be sent, but after the time interval reaches 600 seconds, multiple SIP INFO request messages are sent, where each message includes 50 content reports packaged together, and a last message may include less than 50 content reports.

Recv-Info1: ContentReporting; interval=600; priority=high; number=50; priority=low In the second manner, a sequence of the header field parameters timer, interval, and number is used to represent a priority of the corresponding header field parameter.

For example, referring to an example of Recv-Info2, interval is preceding number, indicating that the priority of interval is higher than that of number.

Recv-Info2: ContentReporting; interval=600; number=50

203: The SCF sends the SIP 200 OK response message to the UE or the MCF.

Specifically, the SIP 200 OK response message may be forwarded to the UE or the MCF through an IMS (IP Multimedia Subsystem, internet protocol multimedia subsystem) core network. When the SIP 200 OK response is sent to the MCF, if an interface exists between the MCF and the SCF, the SIP 200 OK response message may not be forwarded through the IMS core network.

204: The UE or the MCF checks whether the SIP 200 OK response includes the recv-info header field and the corresponding header field parameter. If the SIP 200 OK response includes the recv-info header field and the corresponding header field parameter, the UE or the MCF implements content report according to the new content report configuration information carried in a corresponding parameter in the recv-info header field. Details are as follows:

If the recv-info header field carries the parameter timer, the UE or the MCF modifies the content report timer according to new configuration information of the content report timer carried in timer, and implements content report according to the modified content report timer.

If the recv-info header field carries the parameter interval, the UE or the MCF modifies the content report sending time interval according to new configuration information of the content report sending time interval carried in interval, and implements content report according to the modified time interval.

If the recv-info header field carries the parameter number, the UE or the MCF modifies the number of content reports packaged together to be sent according to new configuration information of the number of content reports packaged together to be sent, where the new configuration information is carried in number, and implements content report according to the modified number of content reports packaged together to be sent.

In the method provided in this embodiment, the SIP 200 OK response message is extended and the header field parameter is used to carry the new content report configuration information, which avoids that the message body of the SIP 200 OK response message is used to transmit the content report configuration information, so that the method is compliant and compatible with logic for processing a SIP INFO message specified in the RFC 2976.

Embodiment 3

Figure 3:
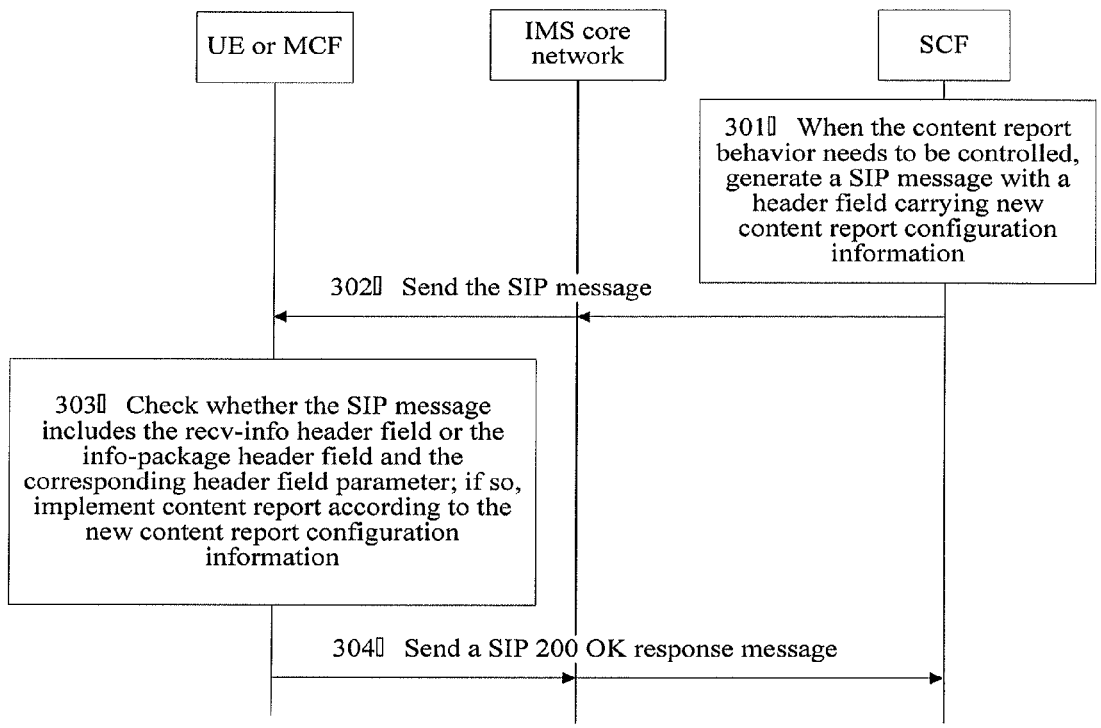
FIG. 3 is a diagram of information interaction for controlling content report behavior according to Embodiment 3 of the present invention.

Referring to FIG. 3, this embodiment provides a method for controlling content report behavior. The method includes the following steps.

301: When needing to control content report behavior, an SCF generates a SIP message with a header field carrying new content report configuration information.

The SIP message may be a SIP UPDATE request message or a SIP re-INVITE request message.

Specifically, a recv-info header field is added in the SIP message, and a preset parameter of the recv-info header field carries the new content report configuration information. The specific carrying manner is the same as that in Embodiment 2 and is not be described here again.

An example of a SIP UPDATE request message is as follows: in this example, SCF1 modifies a content report sending time interval on MCF1 to 600 s, modifies the number of content reports packaged together to be sent to 50, sets a priority of interval to high, and sets a priority of number to low.

UPDATE sip:mcf1@example.com SIP/2.0
Via: SIP/2.0/TCP pc33.example.com; branch=z9hG4bK776
To: MCF1 <sip:mcf1@example.com>; tag=a6c85cf
From: SCF1 <sip:scf1@example.com>; tag=1928301774
Call-ID: a84b4c76e66710@pc33.example.com
CSeq: 314159 UPDATE
Contact: <sip:scf1@pc33.example.com>
Recv-Info: ContentReporting; interval=600; priority=high; number=50; priority=low The SIP message may also be a SIP INFO request message. At this time, a parameter (set to be ContentReportingConfiguration) in an info-package header field may carry the new content report configuration information. The specific method is as follows: the info-package header field is added in the SIP INFO request message, and the parameter ContentReportingConfiguration added in the header field represents the content report configuration information carried in the SIP INFO request message. The specific carrying manner is the same as that in Embodiment 2 and is not be described here again.

An example of a SIP INFO request message is as follows: in this example, SCF1 modifies a content report sending time interval on MCF1 to 600 s, modifies the number of content reports packaged together to be sent to 50, sets the priority of interval to high, and sets the priority of number to low.

INFO sip:mcf1@example.com SIP/2.0
Via: SIP/2.0/TCP pc33.example.com; branch=z9hG4bK776
To: MCF1 <sip:mcf1@example.com>; tag=a6c85cf
From: SCF1 <sip:scf1@example.com>; tag=1928301774
Call-ID: a84b4c76e66710@pc33.example.com
CSeq: 314159 INFO
Contact: <sip: scf1@pc33.example.com>
Info-package: ContentReportingConfiguration; interval=600; priority=high; number=50; priority=low 302: The SCF sends the SIP message to the UE or the MCF.

Specifically, the SIP message may be forwarded to the UE or the MCF through an IMS core network. When the SIP message is sent to the MCF, if an interface exists between the MCF and the SCF, the SIP message may not be forwarded through the IMS core network.

303: The UE or the MCF checks whether the SIP message includes the recv-info header field or the info-package header field and the corresponding header field parameter. If the SIP message includes the recv-info header field or the info-package header field and the corresponding header field parameter, the UE or the MCF implements content report according to the new content report configuration information carried in the corresponding parameter in the header field.

The specific content report manner is the same as that in Embodiment 2 and is not be described here again.

304: The UE or the MCF sends a SIP 200 OK response message to the SCF.

Specifically, the SIP 200 OK response message may be forwarded to the SCF through the IMS core network. When the SIP 200 OK response message is sent by the MCF, if an interface exists between the MCF and the SCF, the SIP 200 OK response message may not be forwarded through the IMS core network.

In the method provided in this embodiment, the SIP UPDATE request message or the SIP re-INVITE request message is extended and the header field parameter is used to carry the new content report configuration information, which avoids that a message body of the SIP 200 OK response message is used to transmit the content report configuration information, so that the method is compliant and compatible with logic for processing a SIP INFO message specified in the RFC 2976. Furthermore, in comparison with Embodiment 2, when needing to control the content report behavior, the SCF generates a corresponding SIP message carrying the new content report configuration information and sends the SIP message to the UE or the MCF, and it is unnecessary to send the SIP message carrying the new content report configuration information after receiving the SIP INFO request message which carries content report information and sent by the UE or the MCF, so the opportunity for controlling the content report behavior is more flexible.

Embodiment 4

Figure 4:
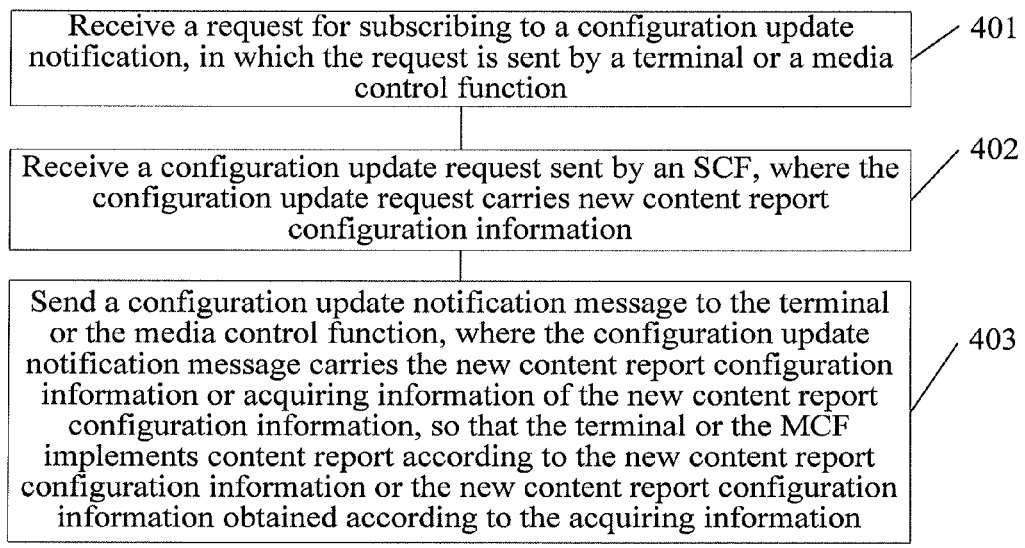
FIG. 4 is a flowchart of a method for controlling content report behavior according to Embodiment 4 of the present invention.

Referring to FIG. 4, this embodiment provides a method for controlling content report behavior. The method includes the following steps.

401: Receive a request for subscribing to a configuration update notification, in which the request is sent by a terminal or a media control function MCF.

402: Receive a configuration update request sent by an SCF, where the configuration update request carries new content report configuration information.

403: Send a configuration update notification message to the terminal or the media control function, where the configuration update notification message carries the new content report configuration information or acquiring information of the new content report configuration information, so that the terminal or the MCF implements content report according to the new content report configuration information or the new content report configuration information obtained according to the acquiring information.

In the method provided in this embodiment, the request for subscribing to the configuration update notification, in which the request is sent by the terminal or the media control function and the configuration update request which carries the new content report configuration information and is sent by the SCF are received, and the configuration update notification message carrying the new content report configuration information or the acquiring information of the new content report configuration information is sent to the terminal or the media control function, which avoids using the message body of a message in a SIP session to transmit the content report configuration information, so that the method is compliant and compatible with logic for processing a SIP INFO message specified in the RFC 2976.

Implementation of controlling the content report behavior is described in combination with a specific example.

Embodiment 5

Figure 5:
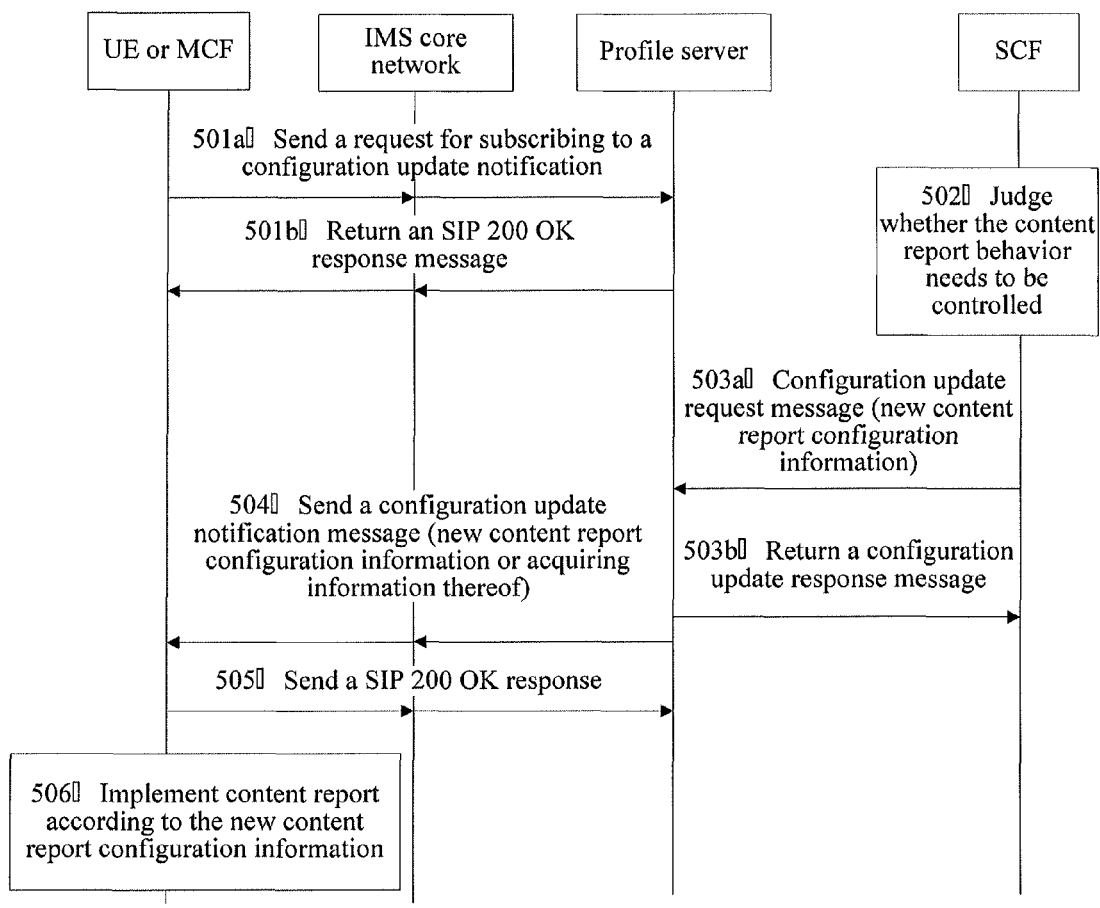
FIG. 5 is a diagram of information interaction for controlling content report behavior according to Embodiment 5 of the present invention.

Referring to FIG. 5, this embodiment provides a method for controlling content report behavior. The method includes the following steps.

501: A UE or an MCF sends a request for subscribing to a configuration update notification (SIP SUBSCRIBE) to an IPTV profile server.

Furthermore, the profile server returns a SIP 200 OK response message to the UE or the MCF.

502: An SCF judges whether the content report behavior needs to be controlled.

503: If the content report behavior needs to be controlled, the SCF sends new content report configuration information to the profile server.

Details are as follows: 503*a*): The SCF sends a configuration update request message carrying the new content report configuration information.

Furthermore, the configuration update request message may also carry a session identity, for indicating a specific session to be controlled. If the session identity is not carried, it indicates by default that all sessions are controlled.

For example, an example of a configuration update request message is as follows: through the message, SCF1 updates content report timers of all SIP sessions between MCF1 and SCF1 with 10 seconds.

```
PUT /mcf/sip:mcf1@example.com/iptv_profile HTTP/1.1
Host: xcap_iptv_profile.example.com
....
Content-Type: application/xml
Content-Length: [XXX]
<?xml version="1.0" encoding="UTF-8"?>
    <CRProfile>
        <Timer>
            <TimerValue>10</TimerValue>
            <SessionID Valid=1>All</SessionID>
        </Timer>
    </CRProfile>
```

503*b*): After completing configuration update, the profile server returns a configuration update response message to the SCF.

A protocol used to transmit a message between the SCF and the profile server includes, but is not limited to, HTTP (Hypertext Transfer Protocol, hypertext transfer protocol) or a SIP.

In order to avoid a logic conflict problem possibly caused by multiple parameters, this embodiment may further set priority information of the content report configuration information in the configuration update request message. The setting manner may be adding a parameter Priority. For details, reference may be made to Embodiment 2, and the details are not described here again.

The profile server may specifically store the content report configuration information in a manner of using an XML (Extensible Markup Language, extensible markup language) file. An example of storing the content report configuration information in the profile server is as follows, where a new XML complex element CRProfile is added in a configuration file. An element or an attribute of CRProfile is described in Table 1.

<xs:element name="IPTVProfile">
<xs:complexType>
<xs:sequence>
<xs:element name="UEProfile" type="uep:tUEProfile" minOccurs="0"/>
<xs:element name="GlobalSettings" type="tGlobalSettings" minOccurs="1"/>
<xs:element name="BCProfile" type="tBCProfile" minOccurs="0"/>
<xs:element name="CoDProfile" type="tCoDProfile" minOccurs="0"/>
<xs:element name="PVRProfile" type="tPVRProfile" minOccurs="0"/>
<xs:element name="CRProfile" type="tCRProfile" minOccurs="0"/>

TABLE 1

| Element/ Attribute Name | Level | Value Range (Integer) | Description |
| --- | --- | --- | --- |
| CRProfile | E1 | 0 . . . 1 | Content report configuration information |
| Timer | E2 | 0 . . . ∞ | Configuration information of a content report timer |
| Priority | A | 0 . . . 1 | Priority of Timer |
| TimerValue | E3 | 1 | Value of a content report timer |
| SessionID | E3 | 0 . . . ∞ | Session identity, where a value "ALL" represents all sessions |
| Valid | A | 1 | 1: indicating a session corresponding to SessionID, where a timer is used 0: indicating a session corresponding to SessionID, where a timer is not used |
| Interval | E2 | 0 . . . ∞ | Configuration information of a content report sending interval |
| Priority | A | 0 . . . 1 | Priority of Interval |
| IntervalValue | E3 | 1 | Value of a content report sending interval |
| SessionID | E3 | 0 . . . ∞ | Session identity, where a value "ALL" represents all sessions |
| Valid | A | 1 | 1: indicating a session corresponding to SessionID, where Interval is used 0: indicating a session corresponding to SessionID, where Interval is not used |
| Number | E2 | 0 . . . ∞ | Configuration information of the number of content reports packaged together to be sent |
| Priority | A | 0 . . . 1 | Priority of Number |
| NumberValue | E3 | 1 | Value of the number of content reports packaged together to be sent |
| SessionID | E3 | 0 . . . ∞ | Session identity, where a value "ALL" represents all sessions |
| Valid | A | 1 | 1: indicating a session corresponding to SessionID, where Number is used 0: indicating a session corresponding to SessionID, where Number is not used |

504: The profile server sends a configuration update notification message to the UE or the MCF, where a message body of the configuration update notification message includes the new content report configuration information or acquiring information thereof.

The new content report configuration information may specifically be a SIP NOTIFY request message (session initiation protocol notification request message). Furthermore, if the configuration update request message can further carry a session identity, the configuration update notification message also needs to carry the session identity. If the configuration update request message can further carry the priority information of the content report configuration information, the configuration update notification message also needs to carry the priority information of the content report configuration information. The acquiring information of the content report configuration information may specifically be address information, for example, an HTTP URL, capable of acquiring the new content report configuration information.

For example, an example of a SIP NOTIFY request message is as follows: the SIP NOTIFY request message carries an acquiring address of the new content report configuration information.

```
NOTIFY sip: mcf1@example.com SIP/2.0
...
Event: xcap-diff
Content-Type: application/xcap-diff+xml
Content-Length: [XXX]
    <?xml version="1.0" encoding="UTF-8"?>
    <d:xcap-diff   xmlns:d="urn:ietf:params:xml:ns:xcap-diff"
xcap-root="http://xcap_iptv_profile.example.com /">
        <d:document previous-etag="7ahggs3"
    sel="/mcf/sip:mcf1@example.com/iptv_profile"new-
    etag="63hjjsll">
        </d:xcap-diff>
```

505: The UE or the MCF sends a SIP 200 OK response to the profile server.

506: The UE or the MCF implements content report according to the new content report configuration information carried in the configuration update notification message or the new content report configuration information obtained according to the acquiring information of the new content report configuration information.

If no session identity is carried, content report is implemented for all sessions by default; if the session identity is carried, content report is implemented for a session designated by the session identity. The specific content report manner is the same as that in Embodiment 2, and is not be described here again.

In the method provided in this embodiment, the request for subscribing to the configuration update notification, in which the request is sent by the terminal or the media control function and the configuration update request that carries the new content report configuration information and is sent by the SCF are received, and the configuration update notification message carrying the new content report configuration information or the acquiring information of the new content report configuration information is sent to the terminal or the media control function, which avoids using the message body of a message in a SIP s ession to transmit the content report configuration information, so that the method is compliant and compatible with logic for processing a SIP INFO message specified in the RFC 2976. Furthermore, in comparison with Embodiments 1, 2, and 3, this embodiment may be available to control one or multiple SIP sessions.

Embodiment 6

Figure 6A:
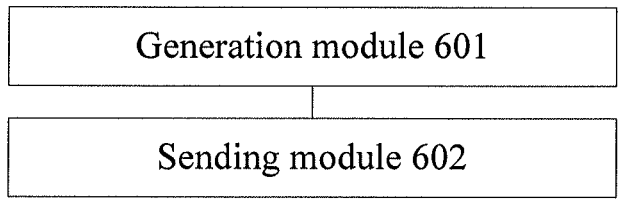
FIG. 6*a* is a schematic structural diagram of a device for controlling content report behavior according to Embodiment 6 of the present invention.

Referring to FIG. 6a, this embodiment provides a device for controlling content report behavior. The device includes a generation module 601 and a sending module 602.

The generation module 601 is configured to generate a session initiation protocol SIP message, where a preset parameter in a header field of the SIP message carries new content report configuration information.

The sending module 602 is configured to send the SIP message generated by the generation module 601 to a terminal or a media control function MCF so that the terminal or the MCF implements content report according to the new content report configuration information.

Figure 6B:
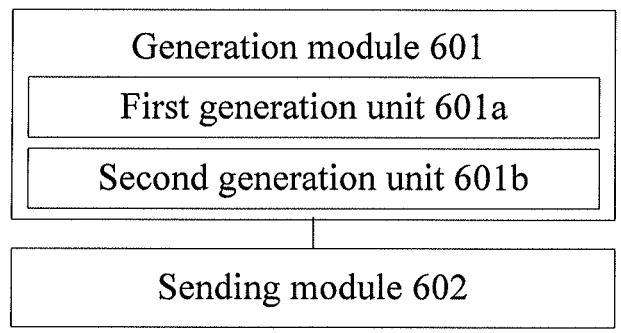
FIG. 6*b* is another schematic structural diagram of the device for controlling the content report behavior according to Embodiment 6 of the present invention.

Referring to FIG. 6b, the generation module 601 includes a first generation unit 601a or a second generation unit 601b.

The first generation unit 601a is configured to generate a session initiation protocol SIP message, where the SIP message is a SIP 200 success OK response message, a SIP update UPDATE request message, or a SIP re-invite re-INVITE request message.

The second generation unit 601b is configured to generate a session initiation protocol SIP message, where the SIP message is a SIP information INFO request message.

A header field of the SIP message in the first generation unit 601a is a receiving information recv-info header field.

A header field of the SIP message in the second generation unit 601b is an information package info-package header field.

The header field of the SIP message in the generation module 601 further carries priority information of the new content report configuration information.

The new content report configuration information in the generation module 601 includes:

at least one of configuration information of a content report timer, configuration information of a content report sending time interval, and configuration information of the number of content reports packaged together to be sent.

The device provided in this embodiment may specifically be an SCF, which has the same design as that in method embodiments 1, 2, and 3. For specific implementation of the SCF, reference may be made to the method embodiments, and the details are not described here again.

In the device provided in this embodiment, the SIP header field parameter is extended to carry the new content report configuration information, which avoids that the message body of a message in a SIP session is used to transmit the content report configuration information, so that the device is compliant and compatible with logic for processing a SIP INFO message specified in the RFC 2976.

Embodiment 7

Figure 7:
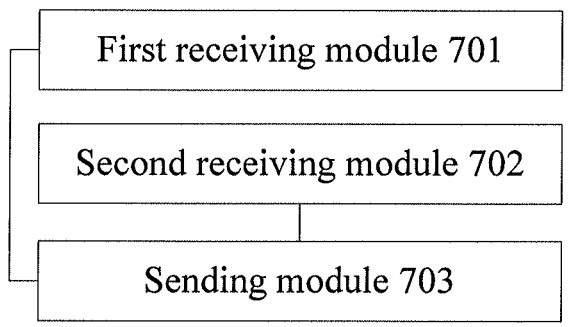
FIG. 7 is a schematic structural diagram of a device for controlling content report behavior according to Embodiment 7 of the present invention.

Referring to FIG. 7, this embodiment provides a device for controlling content report behavior. The device includes a first receiving module 701, a second receiving module 702, and a sending module 703.

The first receiving module 701 is configured to receive a request for subscribing to a configuration update notification, in which the request is sent by a terminal or a media control function.

The second receiving module 702 is configured to receive a configuration update request sent by a service control function SCF, where the configuration update request carries new content report configuration information.

The sending module 703 is configured to send a configuration update notification message to the terminal or the media control function subscribing to the configuration update notification in the first receiving module 701, where the configuration update notification message carries the new content report configuration information received by the second receiving module 702 or acquiring information of the new content report configuration information, so that the terminal or the MCF implements content report according to the new content report configuration information or the new content report configuration information obtained according to the acquiring information.

The second receiving module 702 is specifically configured to:

receive a configuration update request sent by the service control function SCF based on a hypertext transfer protocol HTTP or a session initiation protocol SIP protocol, where the configuration update request carries the new content report configuration information.

The configuration update request received by the second receiving module 702 further carries priority information of the new content report configuration information.

Accordingly, the configuration update notification message sent by the sending module 703 further carries the priority information of the new content report configuration information.

The configuration update request received by the second receiving module 702 further carries a session identity; the configuration update notification message sent by the sending module 703 further carries the session identity.

The device provided in this embodiment may specifically be a profile server, which has the same design as that in method embodiments 4 and 5. For specific implementation of the SCF, reference may be made to the method embodiments, and the details are not described here again.

In the device provided in this embodiment, the request for subscribing to the configuration update notification, in which the request is sent by the terminal or the media control function and the configuration update request that carries the new content report configuration information and is sent by the SCF are received, and the configuration update notification message carrying the new content report configuration information or the acquiring information of the new content report configuration information is sent to the terminal or the media control function, which avoids that the message body of a message in a SIP session is used to transmit the content report configuration information, so that the device is compliant and compatible with logic for processing a SIP INFO message specified in the RFC 2976. Furthermore, the device can be available to control one or multiple SIP sessions.

Embodiment 8

Figure 8:
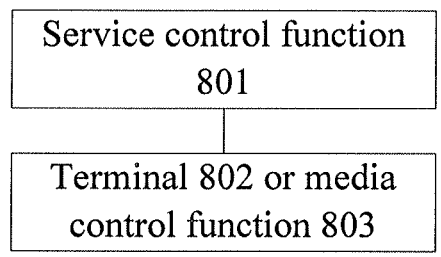
FIG. 8 is a schematic structural diagram of a system for controlling content report behavior according to Embodiment 8 of the present invention.

Referring to FIG. 8, this embodiment provides a system for controlling content report behavior. The system at least includes a service control function SCF 801, and further includes a terminal 802 or a media control function MCF 803.

The SCF 801 is configured to: generate a session initiation protocol SIP message, where a preset parameter in a header field of the SIP message carries new content report configuration information; and send the SIP message to the terminal 802 or the MCF 803.

The terminal 802 or the MCF 803 is configured to implement content report according to the new content report configuration information.

The SIP message may be a SIP 200 success OK response message, a SIP update UPDATE request message, or a SIO re-invite re-INVITE request message. Correspondingly, the header field of the SIP message may be a receiving information recv-info header field.

Further, the SIP message may also be a SIP information INFO request message. Correspondingly, the header field of the SIP message may be an information package info-package header field.

Further, the header field of the SIP message may further carry priority information of the new content report configuration information.

The new content report configuration information includes: at least one of configuration information of a content report timer, configuration information of a content report sending time interval, and configuration information of the number of content reports packaged together to be sent.

In the system provided in this embodiment, the related SCF, the terminal, and the MCF have the same design as those in method embodiments 1, 2, and 3. For specific implementation, reference may be made to the method embodiments, and the details are not described here again.

In the system provided in this embodiment, the SCF uses the extended SIP header field parameter to carry the new content report configuration information, which avoids that the message body of a message in a SIP session is used to transmit the content report configuration information, so that the system is compliant and compatible with logic for processing a SIP INFO message specified in the RFC 2976.

Embodiment 9

Figure 9:
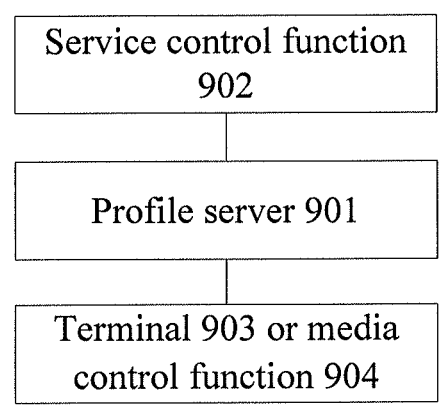
FIG. 9 is a schematic structural diagram of a system for controlling content report behavior according to Embodiment 9 of the present invention.

Referring to FIG. 9, this embodiment provides a system for controlling content report behavior. The system at least includes a profile server 901 and a service control function SCF 902, and further includes a terminal 903 or a media control function MCF 904.

The profile server 901 is configured to: receive a request for subscribing to a configuration update notification, in which the request is sent by the terminal 903 or the MCF 904; receive a configuration update request sent by the SCF 902, where the configuration update request carries new content report configuration information; and send a configuration update notification message to the terminal 903 or the MCF 904, where the configuration update notification message carries the new content report configuration information or acquiring information of the new content report configuration information.

The terminal 903 or the MCF 904 is configured to implement content report according to the new content report configuration information or the new content report configuration information obtained according to the acquiring information.

The receiving a configuration update request sent by the SCF 902 specifically includes: receiving a configuration update request sent by the SCF 902 based on a hypertext transfer protocol HTTP or a session initiation protocol SIP.

Further, the configuration update request further carries priority information of the new content report configuration information. Correspondingly, the configuration update notification message further carries the priority information of the new content report configuration information.

Further, the configuration update request further carries a session identity. Correspondingly, the configuration update notification message further carries the session identity.

In the system provided in this embodiment, the related profile server, the SCF, the terminal, and the MCF have the same design as those in method embodiments 4 and 5. For specific implementation, reference may be made to the method embodiments, and the details are not described here again.

In the system provided in this embodiment, the profile server receives the request for subscribing to the configuration update notification, in which the request is sent by the terminal or the media control function, and the configuration update request which is sent by the SCF and carries the new content report configuration information; and sends the configuration update notification message carrying the new content report configuration information or the acquiring information of the new content report configuration information. This avoids that the message body of a message in a SIP session is used to transmit the content report configuration information, so that the system is compliant and compatible with logic for processing a SIP INFO message specified in the RFC 2976. Furthermore, the system can be available to control one or multiple SIP sessions.

All or part of technical solutions according to the foregoing embodiments may be implemented by software programming, and corresponding software programs may be stored in readable storage media, such as a hard disk, an optical disk, or a floppy disk of a computer.

The above descriptions are merely exemplary embodiments of the present invention, but not intended to limit the present invention. Any modification, equivalent replacement, and improvement made without departing from the spirit and principle of the present invention shall fall within the protection scope of the present invention.

What is claimed is:

1. A method for controlling content report behavior, comprising performing by a Service Control Function (SCF) device having at least a processor executing program codes stored in a memory of the SFC device, which configure the SFC device to perform the following operations:
    collecting current content reporting from a terminal or a media control function (MCF) device, wherein the current content reporting comprises user's current content consumption statistics and accounting information on an existing channel or program; wherein the current content reporting is in response to detecting a request to switch to user's new content consumption from the existing channel or program to another channel or another program in the terminal or the MCF device;
    generating a session initiation protocol SIP message to update new content report configuration information, wherein a preset parameter in a header field of the SIP message carries the new content report configuration information; and
    sending the SIP message to the terminal or the media control function (MCF) device in order that the terminal or the MCF device implements updated content reporting for the SCF device according to the new content report configuration information.

2. The method according to claim 1, wherein the SIP message is a SIP 200 success OK response message, a SIP update UPDATE request message, or a SIP re-invite re-INVITE request message.

3. The method according to claim 2, wherein the header field of the SIP message is a receiving information recv-info header field.

4. The method according to claim 1, wherein the SIP message is a SIP information INFO request message.

5. The method according to claim 4, wherein the header field of the SIP message is an information package info-package header field.

6. The method according to claim 1, wherein the header field of the SIP message further carries priority information of the new content report configuration information.

7. The method according to claim 1, wherein the new content report configuration information comprises:
    at least one of configuration information of a content report timer, configuration information of a content report sending time interval, and configuration information of the number of content reports packaged together to be sent.

8. A method for controlling content report behavior, comprising performing by a profile server having at least a processor executing program codes stored in a memory of the profile server, which configure the profile server to perform the following operations:
    receiving a request for subscribing to a configuration update notification, wherein the request is sent by a terminal or a media control function MCF device;
    receiving a new content configuration update request sent by a service control function SCF device, wherein the new content configuration update request carries new content report configuration information, wherein the SCF device collects current content reporting from the terminal or the media control function (MCF) device, wherein the current content reporting comprises user's current content consumption statistics and accounting information on the existing channel or program and is in response to detecting a request to switch to user's new content consumption from the existing channel or program to another channel or another program in the terminal or the MCF device; and
    sending a configuration update notification message to the terminal or the MCF device, wherein the configuration update notification message carries the new content report configuration information or acquiring information of the new content report configuration information in order that the terminal or the MCF implements updated content reporting for the SCF device according to the new content report configuration information.

9. The method according to claim 8, wherein the receiving a configuration update request sent by a service control function SCF device comprises:
    receiving a configuration update request sent by the SCF device based on a hypertext transfer protocol HTTP or a session initiation protocol SIP.

10. The method according to claim 8, wherein the configuration update request further carries priority information of the new content report configuration information; and
    the configuration update notification message further carries the priority information of the new content report configuration information.

11. The method according to claim 8, wherein the configuration update request further carries a session identity; and
    the configuration update notification message further carries the session identity.

12. A Service Control Function (SFC) device for controlling content report behavior, comprising at least a processor which executes program codes stored in a memory, to configure the SCF device to:
    collect current content reporting from a terminal or a media control function (MCF) device, wherein the current content reporting comprises user's current content consumption statistics and accounting information on an existing channel or program; wherein the current content reporting is in response to detecting a request to switch to user's new content consumption from the existing channel or program to another channel or another program in the terminal or the MCF device;
    generate a session initiation protocol SIP message to update new content report configuration information, wherein a preset parameter in a header field of the SIP message carries new content report configuration information; and send the SIP message to the terminal or the media control function (MCF) device in order that the terminal or the MCF device implements updated content reporting for the SCF device according to the new content report configuration information.

13. The SCF device according to claim 12, is further configured to:
generate a session initiation protocol SIP message, wherein the SIP message is a SIP 200 success OK response message, a SIP update UPDATE request message, or a SIP re-invite re-INVITE request message; and
generate a session initiation protocol SIP message, wherein the SIP message is a SIP information INFO request message.

14. The SCF device according to claim 13, wherein a header field of the SIP message is a receiving information recv-info header field.

15. The SCF device according to claim 13, wherein a header field of the SIP message is an information package info-package header field.

16. The SCF device according to claim 12, wherein the header field of the SIP message further carries priority information of the new content report configuration information.

17. The SCF device according to claim 12, wherein the new content report configuration information comprises:
at least one of configuration information of a content report timer, configuration information of a content report sending time interval, and configuration information of the number of content reports packaged together to be sent.

18. A profile server device for controlling content report behavior, comprising at least a processor which executes program codes stored in a memory, to configure the profile server device to:
receive a request for subscribing to a configuration update notification, wherein the request is sent by a terminal or a media control function MCF device;
receive a new content configuration update request sent by a service control function SCF device, wherein the new content configuration update request carries new content report configuration information, wherein the SCF device collects current content reporting from the terminal or the media control function (MCF) device, wherein the current content reporting comprises user's current content consumption statistics and accounting information on the existing channel or program and is in response to detecting a request to switch the user's new content consumption from the existing channel or program to another channel or another program in the terminal or the MCF device; and
send a configuration update notification message to the terminal or the MCF device subscribing to the configuration update notification, wherein the configuration update notification message carries the new content report configuration information or acquiring information of the new content report configuration information in order that the terminal or the MCF device implements updated content reporting for the SCF device according to the new content report configuration information.

19. The profile server device according to claim 18, wherein the second receiving module is configured to:
receive a configuration update request sent by the SCF device based on a hypertext transfer protocol HTTP or a session initiation protocol SIP, wherein the configuration update request carries the new content report configuration information.

20. The profile server device according to claim 18, wherein the configuration update request further carries priority information of the new content report configuration information; and
the configuration update notification message further carries the priority information of the new content report configuration information.

21. The profile server device according to claim 18, wherein the configuration update request received by the second receiving module further carries a session identity; and
the configuration update notification message sent by the sending module further carries the session identity.

22. A system for controlling content report behavior, at least comprising a service control function (SCF) device, and further comprising a terminal or a media control function (MCF) device, wherein:
the SCF device is configured to:
collect current content reporting from a terminal or a media control function (MCF) device, wherein the current content reporting comprises user's current content consumption statistics and accounting information on an existing channel or program; wherein the current content reporting is in response to detecting a request to switch to user's new content consumption from the existing channel or program to another channel or another program in the terminal or the MCF device
generate a session initiation protocol SIP message to update new content report configuration information, wherein a preset parameter in a header field of the SIP message carries new content report configuration information; and send the SIP message to the terminal or the MCF device; and
the terminal or the MCF device is configured to implement updated content report for the SCF device according to the new content report configuration information.

23. A system for controlling content report behavior, at least comprising a profile server and a service control function (SCF) device, and further comprising a terminal or a media control function (MCF) device, wherein:
the profile server is configured to:
receive a request for subscribing to a configuration update notification, wherein the request is sent by the terminal or the MCF device;
receive a new content configuration update request sent by the SCF device, wherein the new content configuration update request carries new content report configuration information; and send a configuration update notification message to the terminal or the MCF device, wherein the configuration update notification message carries the new content report configuration information, wherein the SCF device collects current content reporting from the terminal or the media control function (MCF) device, wherein the current content reporting comprises user's current content consumption statistics and accounting information on the existing channel or program and is in response to detecting a request to switch to user's new content consumption from the existing channel or program to another channel or another program in the terminal or the MCF device; and
the terminal or the MCF device is configured to implement updated content reporting for the SCF device according to the new content report configuration information.

* * * * *